(12) United States Patent
Mak

(10) Patent No.: US 7,574,856 B2
(45) Date of Patent: Aug. 18, 2009

(54) CONFIGURATIONS AND METHODS FOR POWER GENERATION WITH INTEGRATED LNG REGASIFICATION

(75) Inventor: John Mak, Santa Ana, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 0 days.

(21) Appl. No.: 11/571,901

(22) PCT Filed: Jul. 14, 2005

(86) PCT No.: PCT/US2005/024973

§ 371 (c)(1),
(2), (4) Date: Jan. 8, 2008

(87) PCT Pub. No.: WO2006/019900

PCT Pub. Date: Feb. 23, 2006

(65) Prior Publication Data

US 2008/0190106 A1 Aug. 14, 2008

Related U.S. Application Data

(60) Provisional application No. 60/588,275, filed on Jul. 14, 2004.

(51) Int. Cl.
*F02C 6/00* (2006.01)

(52) U.S. Cl. .................. 60/39.182; 60/645; 60/670

(58) Field of Classification Search ............ 60/39.182, 60/643, 645
See application file for complete search history.

(56) References Cited

U.S. PATENT DOCUMENTS

| 4,036,028 | A | | 7/1977 | Mandrin |
| 4,231,226 | A | | 11/1980 | Griepentrog |
| 5,394,686 | A | * | 3/1995 | Child et al. ............. 60/780 |
| 5,457,951 | A | * | 10/1995 | Johnson et al. ......... 60/780 |
| 2001/0004830 | A1 | * | 6/2001 | Wakana et al. ......... 60/39.182 |
| 2003/0005698 | A1 | | 1/2003 | Keller |

FOREIGN PATENT DOCUMENTS

| EP | 0009387 | 9/1979 |
| EP | 0683847 | 12/1998 |
| EP | 0828925 | 3/2004 |
| WO | 95/16105 | 6/1995 |
| WO | 96/38656 | 12/1996 |
| WO | 99/50536 | 10/1999 |
| WO | 02/097252 | 12/2002 |
| WO | 2004/109180 | 12/2004 |
| WO | 2004/109206 | 12/2004 |
| WO | 2005/043032 | 5/2005 |

* cited by examiner

*Primary Examiner*—Hoang M Nguyen
(74) *Attorney, Agent, or Firm*—Fish & Associates, PC

(57) ABSTRACT

LNG cold is used in a plurality of cycles in a combined power plant to increase power output. Especially preferred plant configurations integrate a combined cycle power plant with a regasification operation in which in a first stage LNG cold provides cooling in an open or closed power cycle. Most preferably, a significant portion of the LNG is vaporized in the first stage. In a second stage LNG cold provides cooling for a heat transfer medium that is used to provide refrigeration for the cooling water to a steam power turbine and for an air intake chiller of a combustion turbine in the power plant.

20 Claims, 7 Drawing Sheets

CONFIGURATIONS AND METHODS FOR POWER GENERATION WITH INTEGRATED LNG REGASIFICATION

This application claims the benefit of our U.S. provisional patent application with the Ser. No. 60/588,275, filed Jul. 14, 2004, and which is incorporated by reference herein.

FIELD OF THE INVENTION

The field of the invention is power generation using Liquefied Natural Gas (LNG), and especially as it relates to power generation in LNG regasification facilities, and/or integration to a combined cycle power plant.

BACKGROUND OF THE INVENTION

While the US has imported crude oil as energy carrier for several decades, natural gas demand has mostly been met from domestic supplies. However, domestic supplies of natural gas are beginning to diminish due to increasing demand from industrial, residential, and/or electric utilities consumers. This situation is further compounded by the replacement of older power plants with new "clean-burning" natural gas power plants. Consequently, LNG import has become economically increasingly attractive, and existing LNG regasification facilities are currently being expanded as well as new regasification facilities are being added. Conventional LNG regasification facilities typically require an external heat source such as an open rack seawater vaporizer, a submerged combustion vaporizer, an intermediate fluid vaporizer (e.g., using a glycol-water mixture), or ambient air vaporizers. LNG vaporization is a relatively energy intensive process and typically requires heating energy of about 3% of the energy content in LNG.

Combined cycle power plants use both steam and gas turbines to generate power, and generally achieve higher energy conversion efficiency than gas or steam only plants. Power plants may be coupled with LNG regasification, as described in U.S. Pat. Nos. 4,036,028 and 4,231,226 to Mandrin and Griepentrog, respectively. Similar configurations are reported in published U.S. Pat. App. No. 2003/0005698 to Keller, EP 0 683 847 and EP 0 828 925 to Johnson et al., WO 02/097252 to Keller, and WO 95/16105 and WO 96/38656 to Johnson. In such known configurations, heat for regasification of LNG is provided by a heat exchange fluid, which is in thermal exchange with the turbine exhaust or a combined cycle power plant.

While some of the above configurations provide reduction in the energy consumption for LNG regasification, gains in power generation efficiencies are often not significant. Still further, and among yet other difficulties, the heat transfer in some of these configurations is limited by the freezing point of the heat transfer medium. Moreover, while the refrigeration content of the LNG is utilized to at least some degree, electric or other power is not extracted from such configurations.

In further known configurations, as described in EP 0 496 283, power is generated by a steam expansion turbine that is driven by a working fluid (here: water) that is heated by a gas turbine exhaust and cooled by a LNG regasification circuit. While such a configuration increases efficiency of a plant to at least some degree, several problems remain. For example, cryogenic refrigeration content of the LNG is typically unused as the freezing point of water or a water glycol mixture is relatively high. To overcome difficulties associated with high freezing temperature, non-aqueous fluids may be employed as a working fluid in the Rankine cycle power generation. Such a configuration is exemplified in U.S. Pat. No. 4,388,092 to Matsumoto and Aoki, in which the fluid is provided by a distillation column operating in a batch distillation cycle. However, the operation of such batch system is difficult and complex. Moreover, most of such Rankine cycle processes fail to utilize the full temperature range in LNG regasification. In still further closed cycle operations as described in EP 0 009 387 to Mak, WO 99/50536 to Minta, or WO 99/50539 to Bowen, closed cycle processes utilize the cold content in LNG or PLNG to produce power. While such conceptually relatively simple processes provide at least some energy from the LNG cold, various disadvantages similar to those provided above remain.

Where LNG is processed to a typically lean LNG with lower heating value, the LNG may be employed as a working fluid in an open cycle within the fractionation processes as described by J. Mak in WO 2004/109180 and WO 2004/109206. In such configurations a portion of the flashed LNG is pumped to pressure and then expanded after a significant portion of the cold has been extracted. The so expanded LNG is then fed to a demethanizer for processing. Such processes typically provide significant energy savings in the production of lean LNG with power co-production. Moreover, these processes also allow production of relatively pure ethane and heavier hydrocarbon components from the rich LNG. However, such configurations are typically limited to LNG processing with nominal power generation requirement and fail to lend themselves to full utilization of the LNG cold in power generation in LNG regasification facilities.

Therefore, while numerous processes and configurations for LNG utilization and regasification are known in the art, all of almost all of them suffer from one or more disadvantages. Thus, there is still a need to provide improved configurations and methods for LNG utilization and regasification.

SUMMARY OF THE INVENTION

The present invention is directed to configurations and methods of processing LNG in a plant in which the refrigeration content in the LNG is utilized to generate power and/or to increase power generation in several stages in combined power production facilities.

In one aspect of the inventive subject matter, a power plant has a first heat exchanger that is configured to receive LNG and to provide refrigeration to a working fluid to thereby generate heated LNG. An expander is also provided and configured to receive the working fluid to thereby drive a generator. A second heat exchanger is configured to receive the heated LNG and to provide refrigeration to a heat transfer medium fluid to thereby generate vaporized LNG. Contemplated plants still further include third and a fourth heat exchanger that are configured to receive the heat transfer medium and to provide refrigeration for an intake air cooler and a steam turbine cycle, respectively.

It should be noted that the working fluid may be circulated in a closed cycle, and will then preferably comprise a multi-component working fluid. Typically, the first heat exchanger is configured such that the heated LNG is at least partially vaporized. With respect to the heat transfer medium in contemplated plants, it is generally preferred that the medium includes a glycol water mixture. The LNG in the first heat exchanger has preferably a temperature of between about −250° F. to about −50° F., and the LNG in the second heat exchanger has preferably a temperature of between about −50° F. to about 40° F. In configurations with closed cycle, it is typically preferred that the LNG is pumped to pipeline pressure before the LNG enters the first heat exchanger. Where desirable, contemplated plants comprise a water condensate line that feeds water condensate from the intake air cooler to a fuel gas humidifier.

Alternatively, the working fluid may also be the LNG to thereby form an open power production cycle. In such configurations, it is typically preferred that the LNG is pumped to supercritical pressure before entering the first heat exchanger (e.g., fuel-fired heater, sea water heater, flue gas heater, and/or a cryogenic process component), and then expanded in the expander to pipeline pressure. To boost efficiency, an auxiliary heat exchanger may be provided to preheat the supercritical LNG using expander discharge from the expander. Thus, the heated and pressurized LNG may have a temperature of 300° F. to 500° F. before entering the expander.

Consequently, a method of operating a plant may have a step in which LNG is heated in a first heat exchanger to provide refrigeration to a working fluid and to thereby generate heated LNG. The working fluid is then employed to drive an expander that is coupled to a generator to thereby generate electricity, and the heated LNG is further heated in a second heat exchanger to provide refrigeration to a heat transfer medium fluid to thereby generate vaporized LNG. The heat transfer medium is then used in third and fourth heat exchangers to provide refrigeration for an intake air cooler and a steam turbine cycle, respectively.

Various objects, features, aspects and advantages of the present invention will become more apparent from the following detailed description of preferred embodiments of the invention, along with the accompanying drawing.

DETAILED DESCRIPTION

The inventor has discovered that the refrigeration content in LNG can be effectively used for power generation in a process that delivers vaporized LNG (most preferably, the vaporized LNG is delivered at pipeline pressure), wherein power is generated and/or power generation is increased at multiple points in a plant. In particularly preferred aspects, the plant combines a combustion turbine generator and heat recovery steam generator with an LNG regasification unit, wherein the combustion turbine may be driven by combustion of a portion of the gasified LNG.

In especially preferred plant configurations, power is produced in a first stage using a Rankine power cycle, wherein the working fluid typically comprises a multi-component fluid mixture to optimize use of the cryogenic temperature of the LNG (preferably in the range of about −250° F. to −50° F.). Alternatively, LNG may also be used in an open Rankine power cycle in the first stage, thereby eliminating the use of an external working fluid. Regardless of the particular configuration (open or closed cycle), it is generally preferred that the LNG is pumped to a pressure that is at least pipeline pressure (e.g., about 1200 psig to about 1500 psig), or even higher.

The second stage of power production and/or increase in power generation preferably includes cooling of various process components and/or fluids using LNG refrigeration content to maximize power output of the plant. Most preferably, combustion turbine intake air and exhaust steam are cooled in a combined cycle power plant utilizing the residual cold content of the LNG (typically in the range of about −50° F. to 40° F.) that has been previously heated in the Rankine cycle. Thus, it should be recognized cryogenic refrigeration content can be employed in a power generation cycle while residual LNG cold may further be exploited to boost power production in one or more processes. In an optionally third stage, the water condensate from chilled gas turbine inlet air from the second stage is recovered and can be used to at least partially saturate the gas turbine fuel gas.

As used herein in the following examples, the term "about" in conjunction with a numeral refers to a range of that numeral starting from 20% below the absolute of the numeral to 20% above the absolute of the numeral, inclusive. For example, the term "about −100° F." refers to a range of −80° F. to −120° F., and the term "about 1000 psig" refers to a range of 800 psig to 1200 psig.

Figure 1:
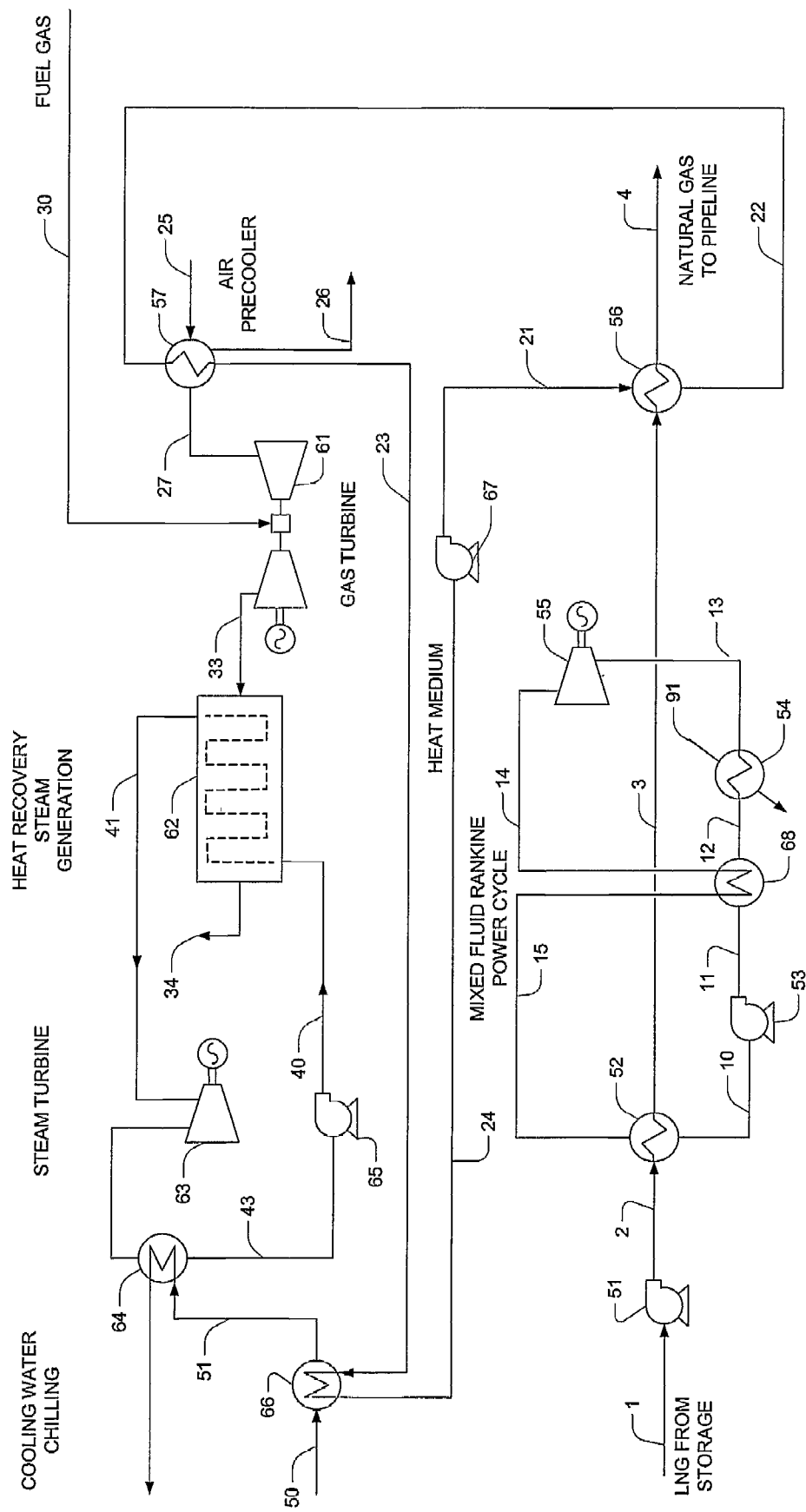
FIG. 1 is a schematic diagram of one exemplary power cycle configuration according to the inventive subject matter for a multi-component fluid Rankine power cycle.

In a first exemplary configuration as depicted in FIG. 1, the Rankine power cycle is a closed power cycle using a multi-component working fluid, wherein power generation is operationally coupled to an LNG regasification and/or processing plant. Most typically, the LNG regasification plant is configured to produce 1.2 BSCFD of natural gas with a gas composition shown in Table 1. Here, LNG stream 1 from storage (or any other suitable source) is provided at a pressure of about 25 psig to 80 psig and at a temperature of about −260° F. to −250° F. Stream 1 is pumped by LNG pump 51 to a suitable pressure, which is typically about 1200 to 1500 psig to form pressurized LNG stream 2, or other pressure as needed to meet specific pipeline requirement. The pressurized LNG stream 2 is heated in the exchanger 52 by the working fluid stream 15 to a temperature of about −50° F. It should be noted that the refrigeration release during LNG regasification is used to condense the multi-component working fluid.

Figure 6:
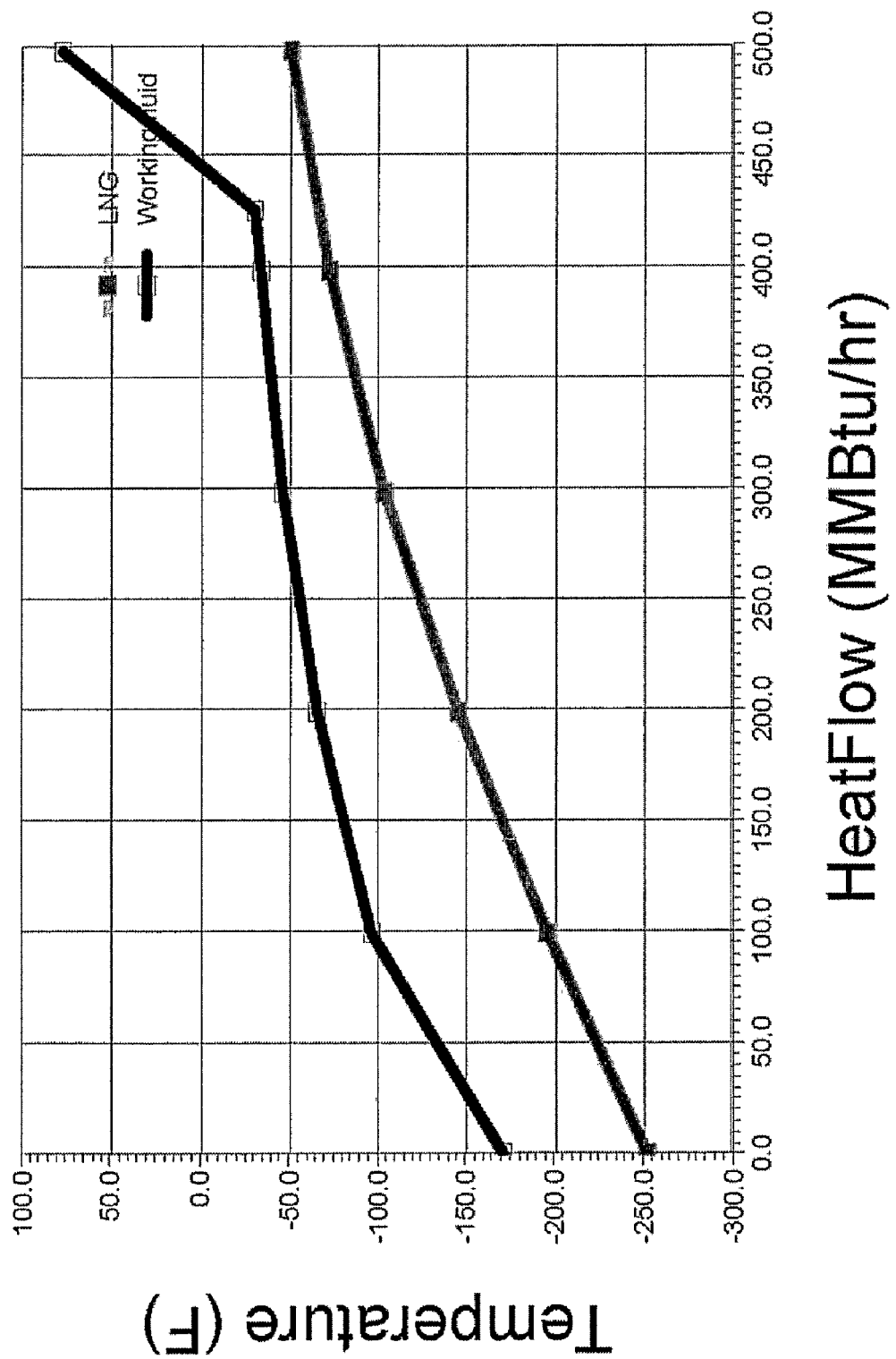
FIG. 6 is a graph depicting an exemplary heat release curve of heat exchanger 52.

With respect to the multi-component working fluid, it is generally preferred that the working fluid composition is selected to effectively utilize the cryogenic temperature of LNG during regasification, typically from about −250° F. to about −50° F. Therefore, exemplary preferred multi-component working fluids may comprise 10% methane, 40% ethane, and 50% propane. However, alternative suitable components and molar fractions are also deemed appropriate and will predominantly depend on the desired heat exchange curves, temperature and composition of the LNG, and desired power generation. Consequently, suitable multi-component fluids will condense at varying temperatures from about 0° F. to 100° F. (dew-point temperature) to about −150° F. to −180° F. (bubble point temperature). It should be appreciated that the varying condensation temperatures of the multi-component fluid will advantageously utilize the varying LNG regasification temperatures with a close temperature approach and minimum loss work that is highly desirable in achieving an efficient power cycle. Still further, it should be recognized that the compositions and/or components of the mixed working fluid can be adjusted as necessary to match the LNG vaporization curve, which is typically determined by LNG composition and regasification pressure. Thus, the mixed working fluid may also contain non-hydrocarbon components, including nitrogen. An exemplary heat exchange curve for heat exchanger 52 is shown in FIG. 6.

With further reference to FIG. 1, the working fluid stream 10 is pumped by pump 53 to about 1500 psig to stream 11 (or higher, e.g., 1500-2500 psig), and heated in exchanger 68 with the expander discharge stream 14 to thereby form stream 12. The heated fluid is further heated in heater 54, preferably with an external heat medium 91 to about 500° F. It should be appreciated that any type of external heat source is deemed suitable for use herein, and exemplary heat sources include flue gas from a gas turbine, waste heat recovery unit, and/or a fired heater. Thus, the temperature of the further heated stream 13 may vary considerably. However, it is generally preferred that the temperature is at least 300° F., more preferably at least 350° F. to 450° F., and most preferably about 500° F. and higher (e.g., 550° F. to 700° F., or more). The so generated high-pressure high temperature working fluid 13 is then expanded in expander 55 to about 15 psig to 45 psig forming stream 14, generating power that can be used to drive an electric generator. Remaining heat content in the expander discharge stream 14 is preferably recovered in exchanger 68 forming stream 15 that is subsequently condensed at cryogenic temperature in exchanger 52 forming stream 10 to repeat the Rankine cycle.

In such exemplary configurations, about 5,000 GPM working fluid are circulated in the Rankine power cycle, generating about 55,000 kW of electric power. Of course, it should be noted that the power generation efficiency can be further increased using higher temperatures of the working fluid. Alternatively, or additionally, the pressure of the working fluid may be increased (e.g., 1500 and 3000 psig, or even higher) to boost power production. Ultimately, economic considerations (e.g., equipment costs and heating requirements) will determine the most desirable pressures and temperatures of the working fluid.

Figure 5A:
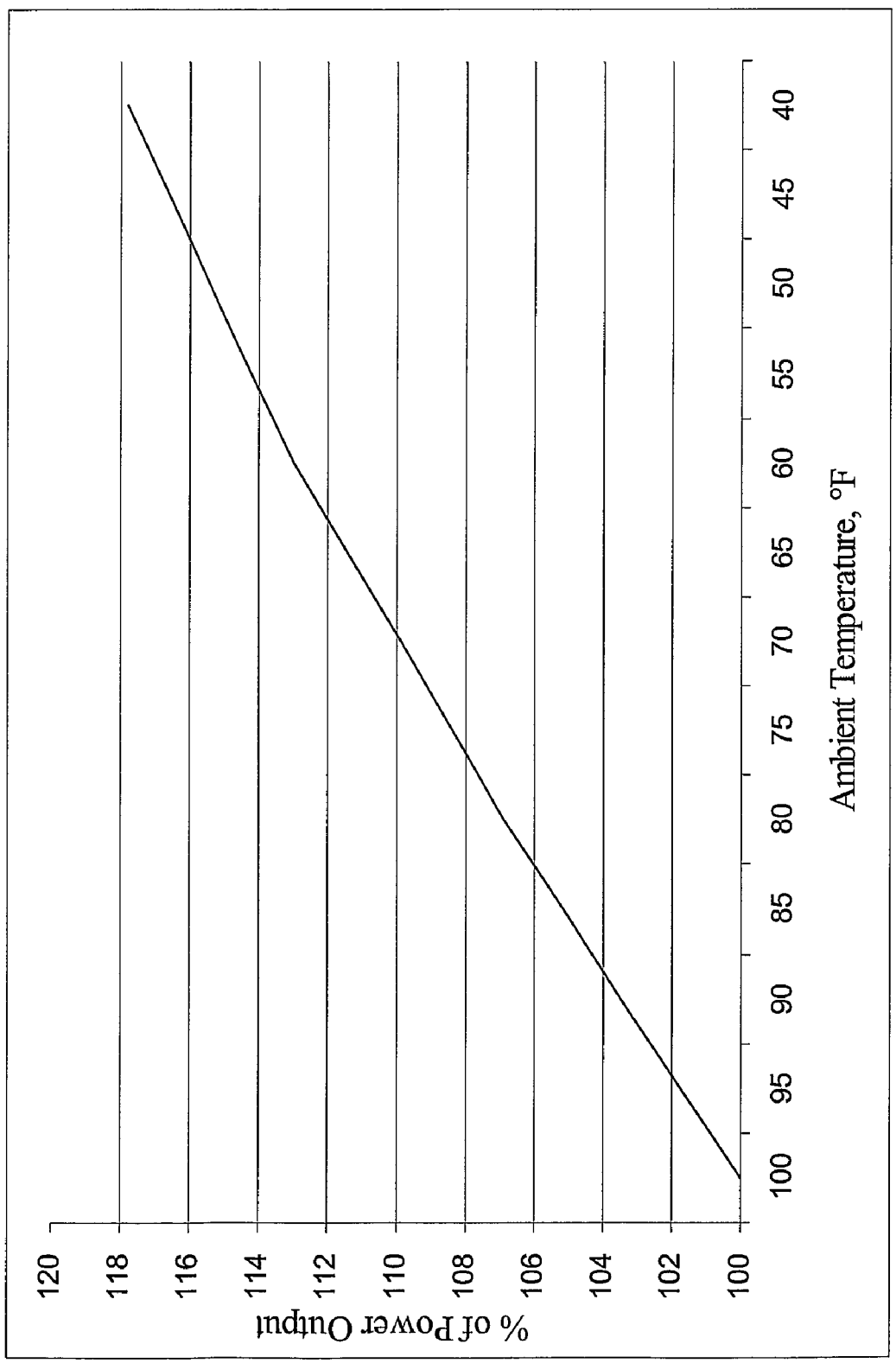
FIGS. 5A and 5B are plots of the combined cycle power plant output at various ambient temperatures.
Figure 5B:
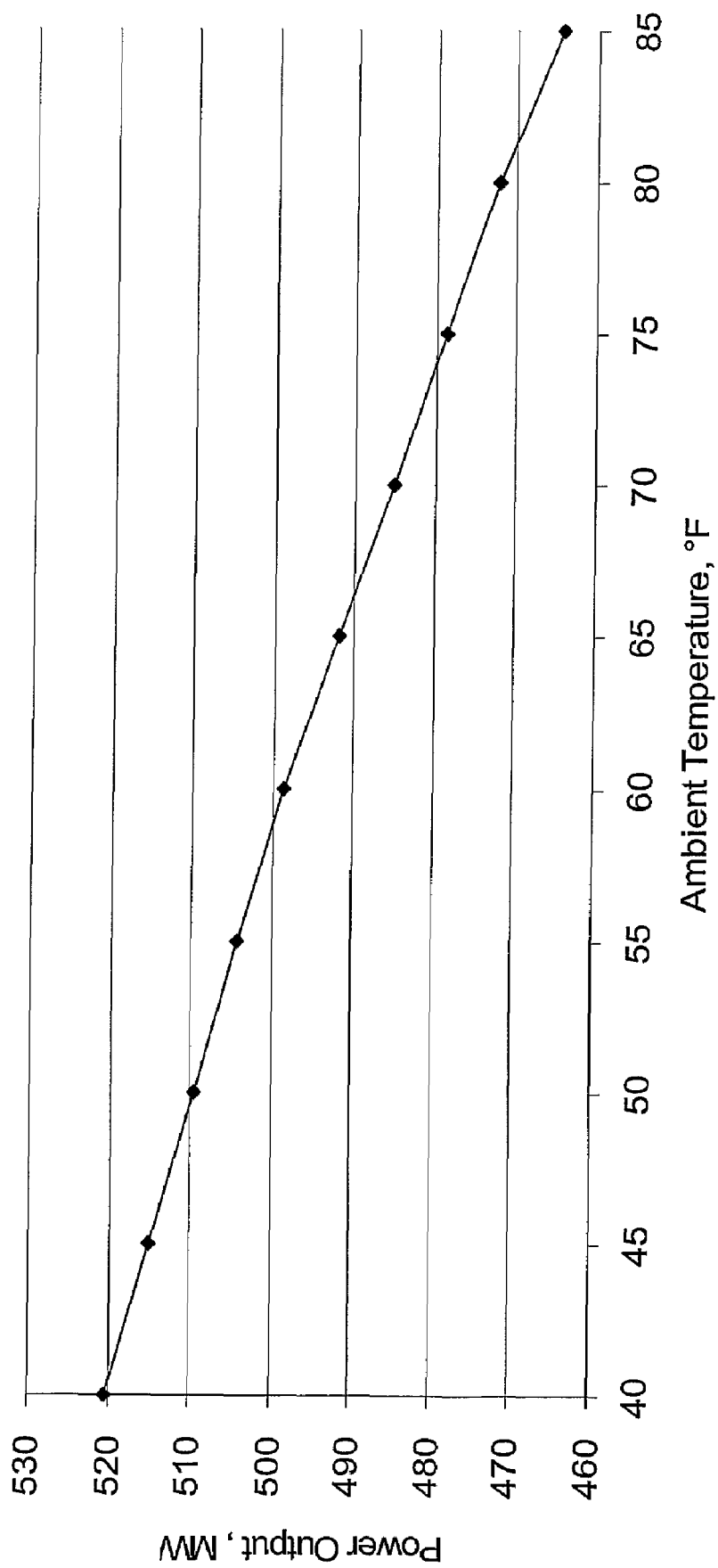

In the second power generation stage of the configuration according to FIG. 1, the residual refrigerant content of LNG (at about −50° F. to 40° F.) from stream 3 is utilized to chill a heat transfer medium (e.g., a glycol-water mixture or alcohol based solvent) that is circulated in a combined cycle power plant. Here, the LNG is heated in exchanger 56 with the glycol-water mixture stream 21. LNG is vaporized to about 40° F. forming stream 4 while the glycol-water mixture is cooled to about 0° F. to 20° F. In most preferred aspects, the chilled glycol-water mixture 22 is first used to chill the combustion air (stream 25) in air pre-cooler 57 from about 100° F. to about 40° to 50° F. In this cooling step, most of the water content in the air is condensed (stream 26). Removal of the water content from the intake air advantageously reduces the mass flow and compression by the gas turbine 61, thus lowering the power consumption and improving the overall power generation efficiency of the gas turbine generator. It should be noted that the quantity of water condensate from intake air can be significant (e.g., as high as 10 vol % in humid localities), and that power generation efficiency can therefore be substantially boosted. Moreover, air pre-cooling also allows higher air mass flow through the gas turbine (due to the increased density of the chilled air), which again provides higher gas turbine power output and efficiency. Exemplary FIGS. 5A and 5B show the impact of ambient air temperature on power generation for a conventional combined cycle power plant. Additionally, it should be noted that gas turbine inlet air-cooling decouples power generation capacity from changes in ambient temperature. Conventional power plants experience a drop in power output when ambient temperatures rise. With gas turbine inlet air cooling, power output and generation efficiency can be maintained at optimum levels throughout the year, dramatically improving power plant economics. As shown in FIGS. 5A and 5B, air pre-cooling typically improves the gas turbine output performance by about 15%. However, it should be recognized that higher efficiency and output may be achieved when ambient air is further cooled, provided that the air pre-cooler is equipped with deicing devices and the gas turbine is designed to handle the higher flow.

With further reference to FIG. 1, the gas turbine generator 61 uses the chilled and preferably dried air (stream 27) and fuel gas (stream 30) for power generation. Fuel gas can be supplied from a portion of the vaporized LNG (stream 4), after the portion is letdown in pressure typically to 250 psig or other pressure as required by the gas turbine. It should be appreciated that the letdown of the fuel gas can further be used to produce additional power (e.g., to operate pumps, compressors, or other components, or to generate electric power). Heat from the gas turbine exhaust (stream 33) is typically captured in a heat recovery steam generation unit 62 (HRSG) for additional steam and power generation. The cooled flue gas stream 34 exits the HRSG to the atmosphere at a temperature of about 300° F. or lower.

Figure 2:
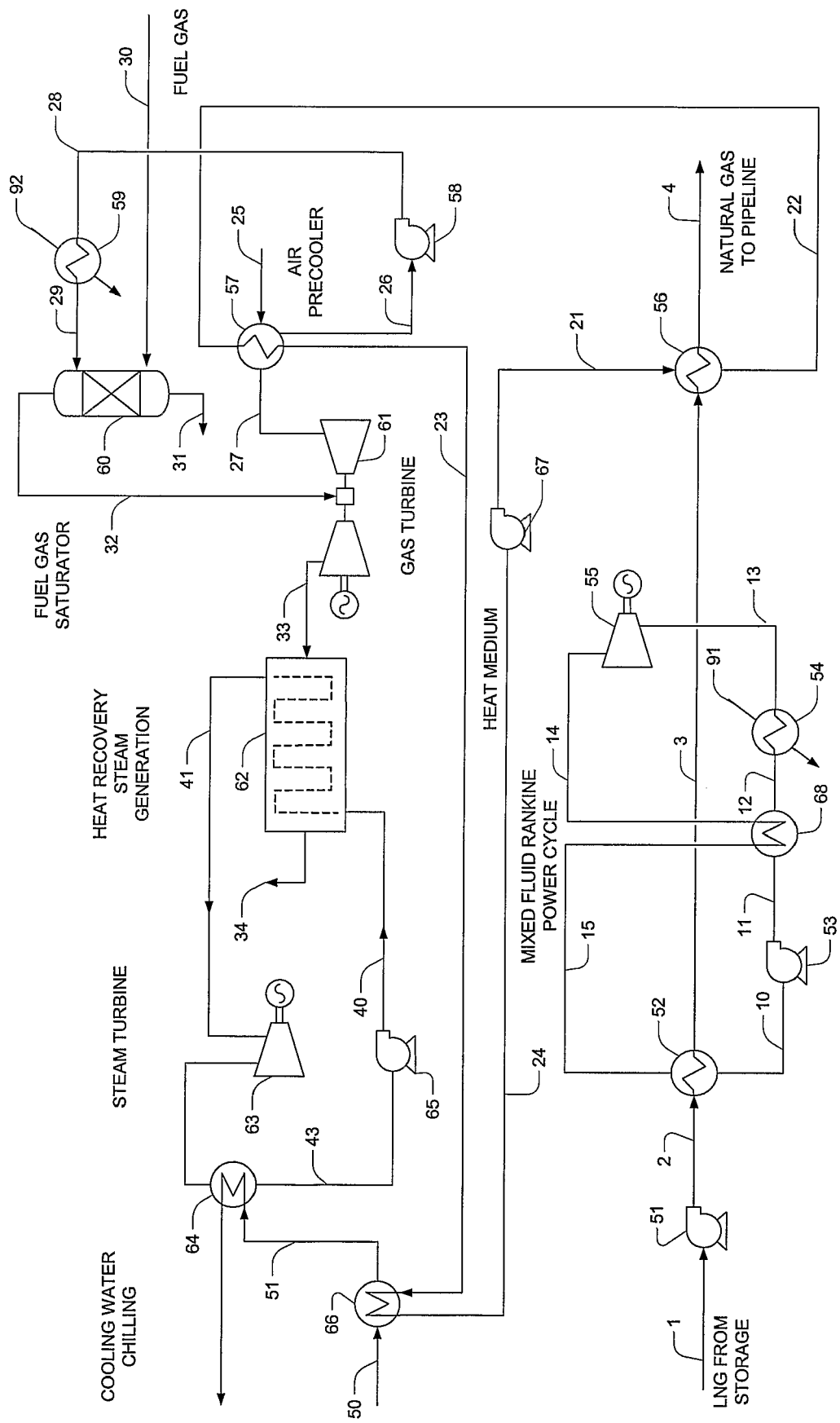
FIG. 2 is a schematic diagram of another exemplary power cycle configuration according to the inventive subject matter for a multi-component fluid Rankine power cycle including fuel gas saturation.

In most of preferred configurations, the steam cycle typically includes a plurality of multi-stage steam turbines 63 that are driven by superheated steam 41 for power generation. It should be noted that by use of the glycol-water coolant stream 23, power generation in such a cycle is substantially boosted. Here, cooling water stream 50, typically at about 80° F. from the utility system, is chilled by the coolant to about 50° F. in exchanger 66 to thereby form stream 24 that is pumped by pump 67 to form stream 21. The chilled cooling water 51 is then used in the steam surface condenser 64, allowing the steam surface condenser to operate at a lower temperature that is advantageous as the steam exhaust pressure can be lowered and power generation can be increased. For example, a conventional steam surface condenser with 80° F. cooling water typically operates at about 2 psia, whereas steam surface condensers according to the present inventive subject matter will have operating pressures of as little as about 1 psia, or even lower. The lower operating pressure on the surface condenser means a lower turbine exhaust pressure. Condensate 43 is pumped by pump 65 to desirable pressure to form stream 40. The steam turbine power output can be increased typically by about 10% to 13%.

Where desirable, contemplated configurations may also include a fuel gas saturator as schematically depicted in FIG. 2. Here, water condensed from the air pre-cooler 57 in the second stage is pumped by pump 58 via stream 26 forming stream 28 that is further heated in a heater 59 using external heat source 92 to about 250° F. forming heated stream 29. The hot water of stream 29 is sent to column 60, typically a countercurrent contact device, to mix with fuel gas stream 30. There are numerous suitable contact devices known in the art, however, particularly preferred devices include column packing or trays configured for heat and mass transfer operation. The so saturated fuel gas is then fed as a moistened fuel gas stream 32 to the combustor of the gas turbine 61 while excess water is removed via stream 31. It should be appreciated that the higher mass flow to the expander section of the gas turbine will increase the power output by about 10%. With respect to remaining elements of FIG. 2, the same considerations as discussed above apply for like components with like numerals of FIG. 1.

Figure 3:
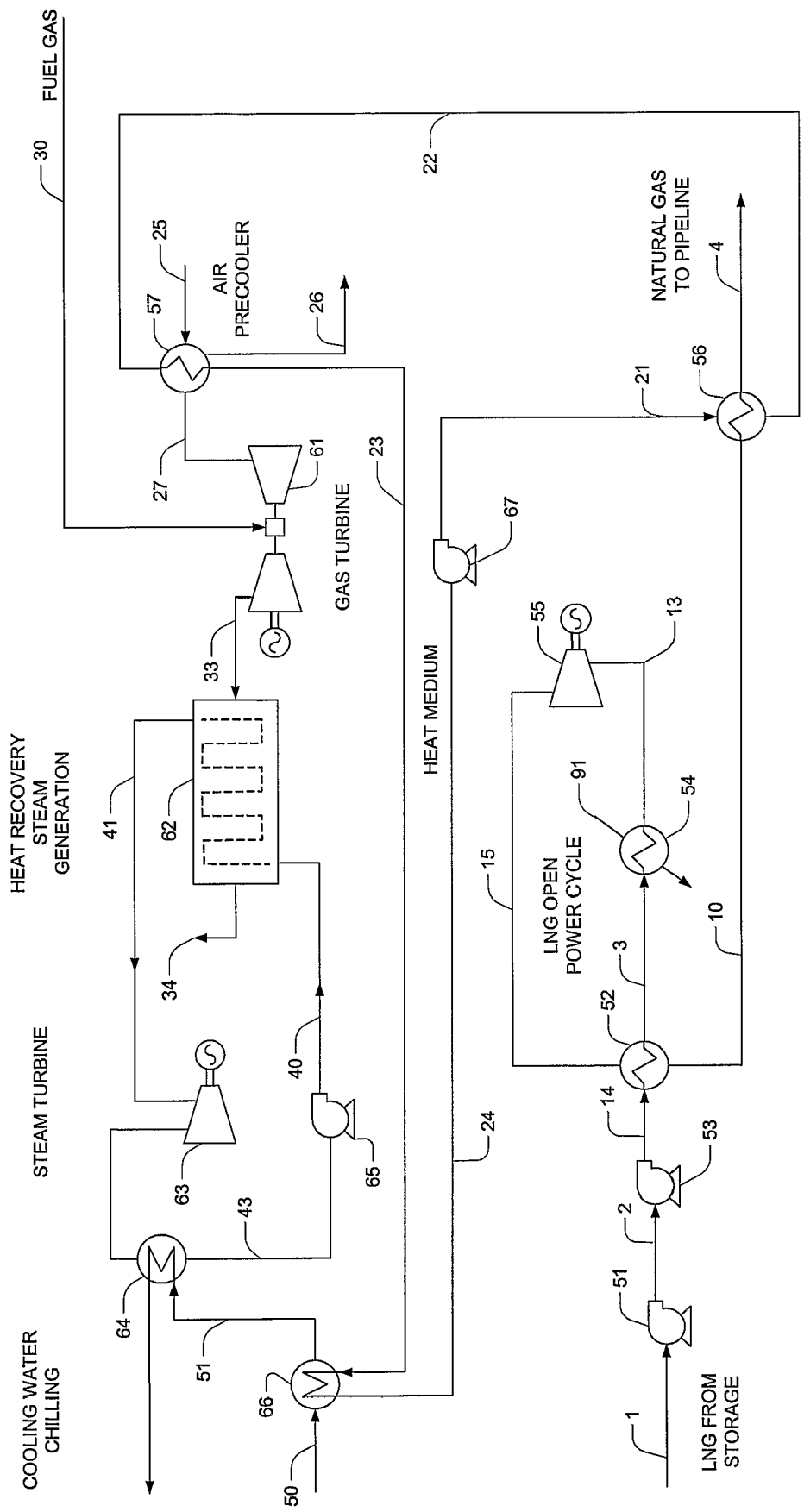
FIG. 3 is a schematic diagram of a further exemplary power cycle configuration according to the inventive subject matter for an LNG Rankine power cycle.

In a second exemplary configuration as depicted in FIG. 3 (e.g., where an external working fluid is not available or not desirable), the LNG can be used as a working fluid in an open Rankine cycle. In such configurations, LNG stream 2 is pumped by a second LNG pump 53 to preferably supercritical pressure (e.g., about 1500 psig to 2500 psig or higher) forming stream 14 that is heat exchanged with expander discharge stream 15 to thereby form stream 3 at about 150° F. The supercritical LNG is further heated with an external heat source 91 in heater 54 to about 300° F. to 500° F. (or even higher), and is then expanded across expander 55 to about 1000 psig (or other pressure, and most preferably pipeline pressure) to generate power that can be used to drive an electric generator. Such open Rankine power cycle is calculated to generate about 45,000 kW under comparable operating conditions. With respect to remaining elements of FIG. 3, the same considerations as discussed above apply for like components with like numerals of FIG. 1.

Figure 4:
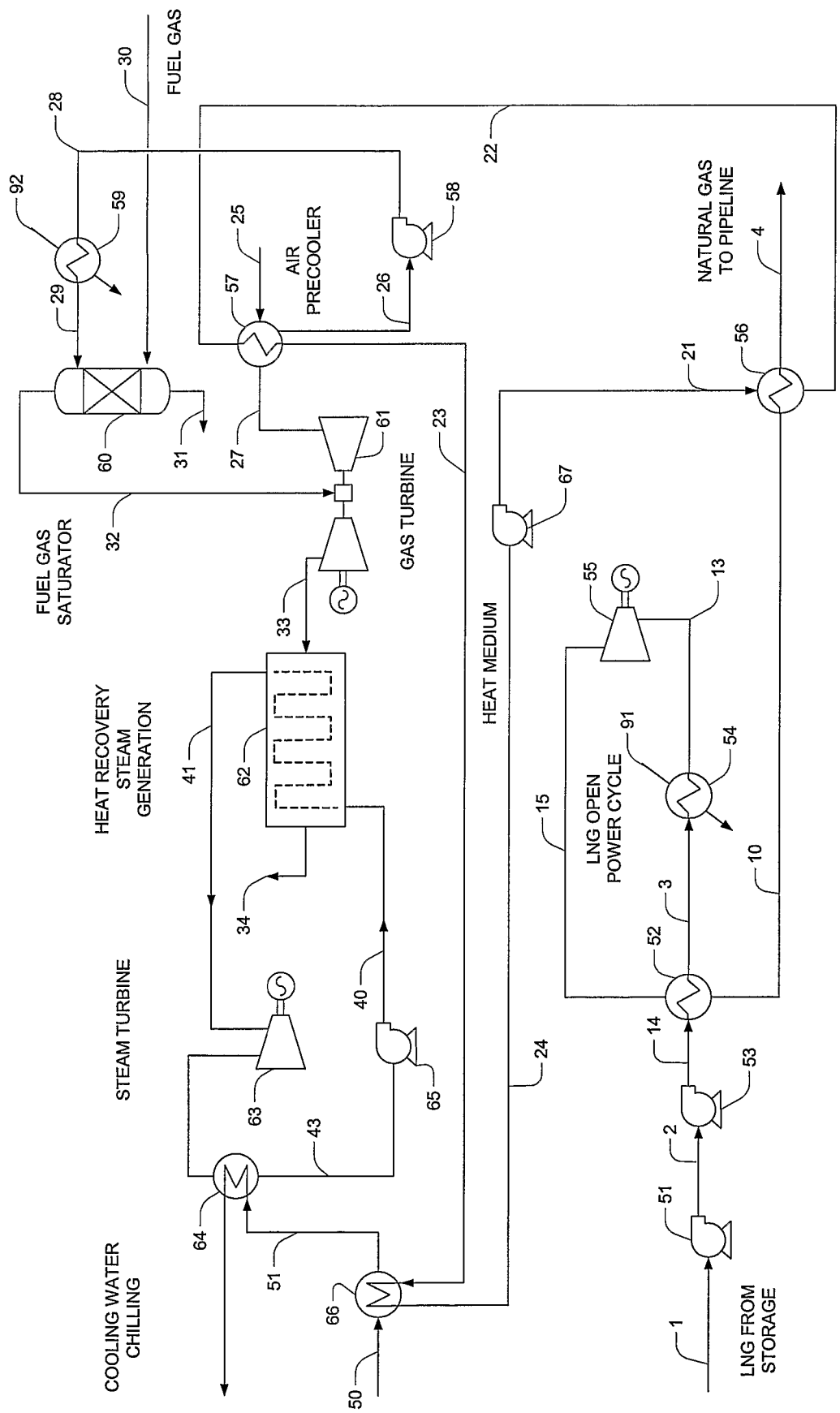
FIG. 4 is a schematic diagram of a still further exemplary power cycle configuration according to the inventive subject matter for an LNG Rankine power cycle including fuel gas saturation.

Similar to the closed and mixed component cycle of FIG. 2 above, contemplated open cycle configurations of FIG. 3 may also include a fuel gas saturator as schematically depicted in FIG. 4. Here, condensed water from the air pre-cooler 57 is utilized to saturate the fuel gas. It should be noted that with respect to the fuel saturation process configurations and operational features are substantially the same as described in previous configuration of FIG. 2. With respect to the remaining elements of FIG. 4, the same considerations as discussed above apply for like components with like numerals of FIGS. 2 and 3.

It is generally preferred that in the first stage of contemplated plants an LNG stream is pumped to a desired pressure and supplies refrigeration to operate a Rankine power cycle. In such plants, the LNG may further be used to chill a heat transfer medium to thereby increase the power output and efficiency of a combined cycle plant. Additionally, water condensed from the gas turbine inlet cooler may be used to saturate the fuel gas to a power plant. Therefore, it should be appreciated that LNG regasification is accomplished without the use of fuel gas fired heaters or seawater heaters.

Therefore, and viewed from another perspective, a LNG regasification plant includes a Rankine power cycle that uses an expander to expand a multi-component working fluid containing at least one or more of the hydrocarbons or other components, (e.g., 10% methane, 40% ethane, and 50% propane) or supercritical LNG to produce work. The Rankine cycle preferably comprises pumping the LNG to a pressure equal or greater than pipeline pressure, optionally preheating the pressurized LNG with the expander discharge, and heating the LNG by an external heat source (e.g., flue gas from a gas turbine, waste heat recovery unit, and/or a fired heater). It should be noted that the LNG exiting the Rankine cycle is at least partially vaporized (e.g., at least 30%, more typically at least 50%, and even more typically at least 70% to 90% vaporized) at a temperature of about −50° F. Therefore, refrigeration can be further extracted from the so heated LNG.

In preferred plants, a second stage is included in which the residual, and relatively high level of refrigeration in the preheated LNG (typically at about −50° F. to 40° F.) is used for cooling a heat transfer medium (e.g., a glycol-water mixture), which in turn cools combustion turbine intake air to a gas turbine, and/or chills the cooling water to a surface condenser in a steam cycle (e.g., of a HRSG). Such configurations substantially increase power generation efficiency in combined cycle power plants.

Additionally, contemplated plants may further comprise a third stage that uses the water condensate from the gas turbine air pre-cooler in the second stage to saturate the fuel gas to a gas turbine. The saturation step typically uses an external heat source at about 200° F. to 300° F. (e.g., flue gas from a gas turbine, waste heat recovery unit, and/or a fired heater) to supply the heat of vaporization of water. It should also be appreciated that low level waste heat such as from the flue gas from the waste heat recovery unit (at about 300° F.) that is normally vented to atmosphere can be utilized. The third stage therefore increases the mass flow to the expander section of the gas turbine, thereby still further increasing the gas turbine power efficiency and output.

Where LNG is employed in a first stage as working fluid in an open Rankine power cycle, it is generally preferred that the LNG is pumped to a supercritical pressure (here: above cricondenbar pressure), heated with the expander discharge and An additional heat source (e.g., integral with, or thermally coupled to the plant), and expanded to the pipeline. The so expanded LNG is then utilized as a coolant to the power plant in a second stage to then become pipeline gas. Thus, in some of the preferred configurations, a power generation cycle and integration of a power plant will utilize refrigeration content while providing regasification of the LNG (wherein the composition of the LNG and the regasified LNG is substantially identical). Since the expander discharge pressure should preferably be at about pipeline pressure, the expansion ratio of the expander is limited and is therefore less efficient than the previous multi-component working fluid cycle. However, it should be recognized that such configurations can advantageously be operated without an external working fluid and therefore substantially simplify process configuration and operation.

Suitable heat sources especially include gas turbine combustion air, cooling water to the surface condenser, and/or flue gas from a gas turbine, or a fuel fired heater. However, numerous alternative heat sources are also contemplated, and it should be appreciated that units other than a combined cycle plant are also considered appropriate as a heat source. For example, suitable alternative heat sources include numerous cryogenic processes (e.g., air separation plants) in which the LNG cools the air or other gas, processes providing flue gas (e.g., combustion turbines, reformer flue gases, etc.), and other processes acting as a cold sink (e.g., carbon dioxide liquid production plants, desalination plants, or food freezing facilities).

It is generally preferred that suitable plants include LNG regasification facilities and LNG receiving terminals, and particularly preferred configurations include those in which LNG is regasified in a process in which at least part of the LNG is used to generate electric power, preferably with integration to a combined power cycle. Exemplary configurations suitable for use in conjunction with the teachings presented herein are described in commonly owned and co-pending international patent application with serial numbers PCT/US03/25372 and PCT/US03/26805, which are incorporated by reference herein. Thus, and depending on the particular heat source, it should be recognized that the energy needed for regasification of the LNG may be entirely, or only partially provided by contemplated heat sources. Where the heat source provides insufficient quantities of heat to completely gasify the LNG, it should be recognized that supplemental heat may be provided. Suitable supplemental heat sources include waste heat from the steam turbine discharge, condensation duty from the flue gas, ambient heating with air (e.g., by providing air conditioning to buildings), with seawater, or fuel gas. Consequently, it should be appreciated that contemplated configurations and processes may be used to retrofit existing regasification plants to improve power generation efficiencies and flexibility, or may be used in new installations.

Therefore, it should be recognized that numerous advantages may be achieved using configurations according to the inventive subject matter. Among other things, contemplated configurations provide highly efficient LNG power generation cycles with or without external working fluid that can be coupled with a conventional combined cycle power plant. Furthermore, in most configurations no external heating for LNG regasification is needed, and thus eliminates the heretofore present need for fuel gas or seawater to heat the LNG in conventional LNG regasification.

Thus, specific embodiments and applications for configurations and methods for power generation with integrated LNG regasification have been disclosed. It should be apparent, however, to those skilled in the art that many more modifications besides those already described are possible without departing from the inventive concepts herein. The inventive subject matter, therefore, is not to be restricted except in the spirit of the present disclosure. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A power plant, comprising:
a first heat exchanger that is configured to receive LNG and to provide refrigeration to a working fluid to thereby generate heated LNG, and an expander configured to receive the working fluid to thereby drive a generator and to produce an expander discharge;
wherein the first heat exchanger is further configured to allow heat exchange between the expander discharge and the LNG;
a second heat exchanger that is configured to receive the heated LNG and to provide refrigeration to a heat transfer medium fluid to thereby generate vaporized LNG; and
a third and a fourth heat exchanger, configured to receive the heat transfer medium and to provide refrigeration for an intake air cooler and a steam turbine cycle, respectively.

2. The power plant of claim 1 wherein the working fluid is circulated in a closed cycle.

3. The power plant of claim 2 wherein the working fluid is a multi-component working fluid.

4. The power plant of claim 1 wherein the first heat exchanger is configured such that the heated LNG is at least partially vaporized.

5. The power plant of claim 1 wherein the heat transfer medium comprises a glycol-water mixture.

6. The power plant of claim 1 wherein the LNG in the first heat exchanger has a temperature of between −250° F. to −50° F., and wherein the LNG in the second heat exchanger has a temperature of between −50° F. to 40° F.

7. The power plant of claim 1 wherein first and second heat exchangers are configured such that LNG is vaporized at a flow rate of between about 200 million standard cubic foot per day and 2 billion standard cubic foot per day.

8. The power plant of claim 1 further comprising a pump that pumps the LNG to pipeline pressure before the LNG enters the first heat exchanger.

9. The power plant of claim 1 further comprising a water condensate line that feeds water condensate from the intake air cooler to a fuel gas humidifier.

10. The power plant of claim 1 wherein the working fluid is the LNG to thereby form an open power production cycle.

11. The power plant of claim 10 further comprising a pump that pumps the LNG to supercritical pressure.

12. The power plant of claim 11 wherein the first heat exchanger comprises a component selected from the group consisting of a fuel-fired heater, a sea water heater, a flue gas heater, and a cryogenic process component.

13. The power plant of claim 11 wherein the expander is configured to expand the supercritical LNG to pipeline pressure.

14. The power plant of claim 11 further comprising an auxiliary heat exchanger that is configured to preheat the supercritical LNG using expander discharge from the expander.

15. The power plant of claim 14 wherein the first heat exchanger and the auxiliary heat exchanger are configured such that the supercritical LNG has a temperature of about 300° F. to 500° F.

16. A method of operating a plant, comprising:
heat exchanging LNG in a first heat exchanger against an expander discharge stream to provide refrigeration to a working fluid and to thereby generate heated LNG;
using the working fluid to drive an expander that is coupled to a generator to thereby generate electricity and the expander discharge stream;
further heating the heated LNG in a second heat exchanger to provide refrigeration to a heat transfer medium fluid and to thereby generate vaporized LNG; and
using the heat transfer medium in third and fourth heat exchangers to provide refrigeration for an intake air cooler and a steam turbine cycle, respectively.

17. The method of claim 16 wherein the first heat exchanger is configured such that the heated LNG is at least partially vaporized.

18. The method of claim 16 wherein the working fluid is a multi-component working fluid.

19. The method of claim 16 wherein the working fluid is the LNG.

20. The method of claim 16 wherein the LNG is pumped to at least pipeline pressure before entering the first heat exchanger.

* * * * *